US008863246B2

(12) United States Patent
Norman et al.

(10) Patent No.: US 8,863,246 B2
(45) Date of Patent: *Oct. 14, 2014

(54) SEARCHING AND REPLACING CREDENTIALS IN A DISPARATE CREDENTIAL STORE ENVIRONMENT

(75) Inventors: James M. Norman, Pleasant Grove, UT (US); Cameron Mashayekhi, Salt Lake City, UT (US); Karl E. Ford, Highland, UT (US)

(73) Assignee: Apple Inc., Cupertino, CA (US)

( * ) Notice: Subject to any disclaimer, the term of this patent is extended or adjusted under 35 U.S.C. 154(b) by 1674 days.

This patent is subject to a terminal disclaimer.

(21) Appl. No.: 11/897,737

(22) Filed: Aug. 31, 2007

(65) Prior Publication Data

US 2009/0064290 A1 Mar. 5, 2009

(51) Int. Cl.
*H04L 29/06* (2006.01)
*G06F 21/41* (2013.01)
*G06F 21/34* (2013.01)
*G06F 21/62* (2013.01)
*G06F 21/31* (2013.01)

(52) U.S. Cl.
CPC ............... *G06F 21/34* (2013.01); *G06F 21/41* (2013.01); *G06F 21/6209* (2013.01); *G06F 21/31* (2013.01); *H04L 63/0815* (2013.01)
USPC ............... 726/5; 726/4; 726/6; 726/7; 726/8; 713/168; 713/169; 713/170

(58) Field of Classification Search
CPC ........................... G06F 21/41; H04L 63/0815
USPC ............................................................. 726/5
See application file for complete search history.

(56) References Cited

U.S. PATENT DOCUMENTS

| | | |
|---|---|---|
| 6,006,018 A | 12/1999 | Burnett et al. |
| 6,067,623 A | 5/2000 | Blakley, III et al. |
| 6,182,229 B1 * | 1/2001 | Nielsen .............................. 726/8 |
| 6,615,253 B1 | 9/2003 | Bowman-Amuah |
| 6,651,168 B1 | 11/2003 | Kao et al. |
| 6,779,117 B1 * | 8/2004 | Wells .............................. 726/24 |
| 6,779,177 B1 | 8/2004 | Bahrs et al. |
| 6,971,005 B1 | 11/2005 | Henry et al. |
| 7,058,180 B2 | 6/2006 | Ferchichi et al. |

(Continued)

OTHER PUBLICATIONS

Novell, Inc. "Common Authentication Service Adapter (CASA)," Novell Developer Kit, www.novell.com, Nov. 18, 2005, 55 pps.

(Continued)

*Primary Examiner* — Longbit Chai
(74) *Attorney, Agent, or Firm* — Fish & Richardson P.C.

(57) ABSTRACT

Apparatus and methods are described for searching and replacing user credentials in a multiple disparate credential store environment. Upon authentication of a user to change credentials, credential information of multiple disparate credential stores is searched. Upon population of search results, users indicate which of the credentials they desire to change and results are committed upon affirmative execution in a user interface dialog. In this manner, users locate their credential information, from whatever store, and change it in quantity or singularly from a single point of control. They can also fully understand how many passwords, secrets, keys, etc., they have over the many disparate stores available to them and affirmatively control their relationship to other credential information. Reversion of credential information to an earlier time is still another feature as is retrofitting existing SSO services. Computer program products and computing network interaction are also disclosed.

30 Claims, 7 Drawing Sheets

(56) References Cited

U.S. PATENT DOCUMENTS

| | | | |
|---|---|---|---|
| 7,076,795 | B2 | 7/2006 | Hahn |
| 7,107,310 | B2 | 9/2006 | McCarthy |
| 7,107,610 | B2 | 9/2006 | Lortz |
| 7,137,006 | B1 | 11/2006 | Grandcolas et al. |
| 7,275,259 | B2* | 9/2007 | Jamieson et al. ............. 726/8 |
| 7,310,734 | B2 | 12/2007 | Boate et al. |
| 7,496,953 | B2 | 2/2009 | Andreev et al. |
| 7,552,222 | B2 | 6/2009 | Garimella et al. |
| 7,562,113 | B2 | 7/2009 | Labarge et al. |
| 7,634,803 | B2 | 12/2009 | Birk et al. |
| 7,644,086 | B2 | 1/2010 | Boozer et al. |
| 7,703,128 | B2* | 4/2010 | Cross et al. ............. 726/6 |
| 7,788,497 | B2 | 8/2010 | Luo et al. |
| 2002/0046064 | A1 | 4/2002 | Maury et al. |
| 2003/0012382 | A1 | 1/2003 | Ferchichi et al. |
| 2003/0195970 | A1 | 10/2003 | Dinh et al. |
| 2004/0083238 | A1* | 4/2004 | Louis et al. ............. 707/200 |
| 2004/0260953 | A1* | 12/2004 | Jamieson et al. ............. 713/202 |
| 2005/0005094 | A1 | 1/2005 | Jamieson et al. |
| 2005/0081055 | A1 | 4/2005 | Patrick et al. |
| 2005/0097166 | A1 | 5/2005 | Patrick et al. |
| 2005/0097352 | A1 | 5/2005 | Patrick et al. |
| 2005/0144482 | A1* | 6/2005 | Anuszewski ............. 713/201 |
| 2005/0171872 | A1 | 8/2005 | Burch et al. |
| 2005/0268307 | A1 | 12/2005 | Gates et al. |
| 2005/0289341 | A1 | 12/2005 | Ritola et al. |
| 2005/0289644 | A1* | 12/2005 | Wray ............. 726/5 |
| 2006/0013393 | A1 | 1/2006 | Ferchichi et al. |
| 2006/0037066 | A1* | 2/2006 | Audebert ............. 726/5 |
| 2006/0047625 | A1 | 3/2006 | Ho et al. |
| 2006/0075224 | A1* | 4/2006 | Tao ............. 713/164 |
| 2006/0080352 | A1 | 4/2006 | Boubez et al. |
| 2006/0218630 | A1* | 9/2006 | Pearson et al. ............. 726/8 |
| 2006/0235935 | A1 | 10/2006 | Ng |
| 2006/0248577 | A1 | 11/2006 | Beghian et al. |
| 2007/0006291 | A1 | 1/2007 | Barari et al. |
| 2007/0143829 | A1 | 6/2007 | Hinton et al. |
| 2007/0157296 | A1 | 7/2007 | Lioy |
| 2007/0220268 | A1* | 9/2007 | Krishnaprasad et al. ...... 713/182 |
| 2007/0283425 | A1* | 12/2007 | Ture et al. ............. 726/5 |
| 2008/0016232 | A1 | 1/2008 | Yared et al. |
| 2008/0021997 | A1 | 1/2008 | Hinton |
| 2008/0059804 | A1 | 3/2008 | Shah et al. |
| 2008/0072320 | A1* | 3/2008 | Hurley ............. 726/21 |
| 2008/0077809 | A1 | 3/2008 | Hayler et al. |
| 2008/0092215 | A1 | 4/2008 | Soukup et al. |
| 2008/0104411 | A1* | 5/2008 | Agrawal et al. ............. 713/183 |
| 2008/0184349 | A1 | 7/2008 | Ting |
| 2008/0196090 | A1 | 8/2008 | Baron et al. |
| 2008/0263365 | A1* | 10/2008 | Aupperle et al. ............. 713/185 |
| 2008/0276309 | A1 | 11/2008 | Edelman |
| 2008/0301784 | A1 | 12/2008 | Zhu et al. |
| 2008/0320576 | A1 | 12/2008 | Curling |
| 2009/0007248 | A1 | 1/2009 | Kovaleski |
| 2009/0013395 | A1 | 1/2009 | Marcus et al. |
| 2009/0320118 | A1 | 12/2009 | Muller et al. |

OTHER PUBLICATIONS

Bandit, "Common Authentication Service Adapter (CASA) Architecture," www.bandit-project.org/index.php/Common_Authentication_Services_Adapter_%28CASA%29_Architecture, Jul. 19, 2007, 4 pps.

Bandit, "Common Authentication Service Adapter (CASA) Architecture," www.bandit-project.org/index.php?title=Common_Authentication_Services_Adapter_%28CASA%29_Architecture&diff=3826&oldid=2955, Jul. 19, 2007, 4 pps.

Bandit, "Common Authentication Service Adapter (CASA) Architecture," www.bandit-project.org/index.php?title=Common_Authentication_Services_Adapter_%2SCASA%29_Architecture&diff=3826&oldid=1822, Aug. 17, 2007, 5 pps.

Bandit, "Common Authentication Service Adapter (CASA) Architecture," /www.bandit-project.org/index.php?title=Common_Authentication_Services_Adapter_%28CASA%29_Architecture&action=history, Jul. 19, 2007, 2 pps.

Microsoft, "Find and Replace," Microsoft Office Word 2003, Screenshot, printed Aug. 11, 2007, 1 page.

Free Downloadscenter, "Find and Replace Tool for Word 1.0 screenshot," www.freedownloadcenter.com/Utilities/Misc_Text_Editing_Tools/Find_and . . . , Aug. 29, 2007, 1 page.

USPTO Office Action dated Sep. 17, 2010 for U.S. Appl. No. 11/901,397, 14 pgs.

USPTO Office Action dated Sep. 2, 2010 for U.S. Appl. No. 11/893,780, 20 pgs.

USPTO Office Action dated May 25, 2011 for U.S. Appl. No. 12/036,596.

USPTO Office Action dated Feb. 22, 2011 for U.S. Appl. No. 11/901,397.

Microsoft,"Find and Replace," Microsoft Office Word 2003, Screenshot, printed Sep. 17, 2007, 1 page.

Free Downloads Center, "Find and Replace Tool for Word 1.0 screenshot," www.freedownloadcenter.com/Utilities/Misc. Text Editing Tools/Find and . . . Sep. 17, 2007.

USPTO Office Action dated Dec. 22, 2010 for U.S. Appl. No. 12/036,596.

USPTO Office Action dated Dec. 14, 2010 for U.S. Appl. No. 12/023,401.

USPTO Office Action dated Mar. 17, 2011 for U.S. Appl. No. 11/897,737.

USPTO Office Action dated Jan. 7, 2001 for U.S. Appl. No. 11/893,780.

* cited by examiner

SEARCHING AND REPLACING CREDENTIALS IN A DISPARATE CREDENTIAL STORE ENVIRONMENT

FIELD OF THE INVENTION

Generally, the present invention relates to computing environments involving heterogeneous credential stores with disparate credential information. Particularly, it relates to coordinating the disparateness of the stores into harmonized versions to provide management from a single point of control, including searching and replacing the credentials of the various stores. Credentials themselves have proprietary structures based on the type of the stores they are saved in and these credentials are encrypted using different cryptographic algorithms and methods. Therefore, in the absence of a standard format and cryptographic algorithm in the field, the format and the components of credentials vary from store to store. However, regardless of the difference of formatting and encryption based on the proprietary implementations most of the credentials have essential and common components such as Identifiers and Secrets. Identifiers are the type of data used to select or introduce the owner of the credential to the target authentication system and commonly is stored in the clear (not encrypted). Secrets are the inherently encrypted component of the credential that are only owned or known to the owner of the data that should be encrypted to protect security and integrity of the credential (such as passwords or keys stored on smart cards). Users can find their credentials in bulk or singularly. They can also link together various passwords, keys or other secrets to maintain convenience in environments, such as single-sign-on (SSO) environments, regardless of the disparateness of the stores. Various features relate to computer program products, systems for same and methods.

BACKGROUND OF THE INVENTION

Newer computer operating systems such as Linux, Windows XP, or Windows Vista provide multiple credential stores for network client applications' usage. These credential stores usually are utilized to provide mechanisms for applications to store credentials for the user, and retrieve them later to provide a single-sign-on (SSO) experience. More famous of these credential stores by name are: Firefox password manager, Gnome Keyring, KDE Wallet, Windows Passport, CASA, SecretStore etc.

Applications, based on their needs or at the time of their development, are closely integrated with a particular credential store. This is due to applications utilizing different credential stores and different types. As a result, there is a need for a single point of administration and access for the user. Currently, however, users must launch different management utilities for each store to manage their credentials. Presently, there are no tools available to provide the ability to copy, move, or link credentials among different versions of the same applications or multiple applications sharing the same credential. To allow credentials to be available for use and management in different stores, currently you have to manually create, copy, or delete them from one store to another. Intuitively, this is inconvenient and impractical.

Also, it presently exists that each credential store has proprietary interests in only offering solutions focused on their store and not interoperability with other stores, thereby avoiding ease of use for end users.

In view of these various problems, there is need in the art of credential stores to provide a mechanism to synchronize the values of credentials between stores, thereby eliminating the need for manually maintaining credentials in multiple stores. There is also a need to be able to conveniently locate credentials and change them singularly or in bulk so as to eliminate tediousness in user management of credentials. In that many computing configurations already have existing SSO technology, it is further desirable to leverage existing configurations by way of retrofit technology, thereby avoiding the costs of providing wholly new products. Taking advantage of existing frameworks, such as the CASA (Common Authentication Service Adapter) software offering by Novell, Inc., the common assignee of this invention, is another feature that optimizes existing resources. Any improvements along such lines should further contemplate good engineering practices, such as automation, relative inexpensiveness, stability, ease of implementation, low complexity, flexibility, etc.

SUMMARY OF THE INVENTION

The foregoing and other problems become solved by applying the principles and teachings associated with the hereinafter-described searching and replacing credentials in a disparate credential store environment. At a high level, methods and apparatus are provided that allow linking of credentials amongst different stores and provide access to them through a utility that provides for a single point of access and management. This is contemplated to be particularly useful when there are multiple versions of the same application such as a web based, command line, GUI, and perhaps older and newer versions that might have different methods of storing credentials in different stores. Linking will provide the ability to manage from a single point as well as synchronization of credentials regardless of credential store of origin. It also provides a mechanism to synchronize the values of credentials between stores, eliminating the need for manually maintaining credentials in multiple stores by the user. The user simply changes one value in a given credential and all linked or synchronized values will be updated automatically. In addition, policies can be applied to expand or filter credential availability across different stores.

In one embodiment, users are first authenticated for authority to change credential information. Second, credential information of the multiple disparate credential stores is searched. Upon population of search results, users indicate which credentials they desire to change. Results are committed upon affirmative execution in a user interface dialog. In this manner, users can locate their credential information, from whatever store, and change it in quantity or singularly from a single point of control. They can also fully understand how many passwords, secrets, keys, etc., they have over the many disparate stores available to them and affirmatively control their relationship to other credential information. Unlinking of credential information is still another feature as is retrofitting of existing SSO services. Computer program products and computing network interaction are also disclosed.

In still other embodiments, a synchronizing engine requests and receives past and present credential information from the disparate credential stores. Users indicate which, if any, of the credential information they desire to synchronize together. Upon common formatting of the credential information, comparisons reveal whether differences exist between the past and present versions. If differences exist, the information is updated.

In any embodiment, users are provided the means to search and replace values of encrypted secrets associated with the credentials that require to be synchronized. For example, a user might set their email and spreadsheet programs to use the same password on their desktop. Then, when in an environment such as Novell, Inc., if the IS (information services) department changes and synchronizes the application credentials on the back-end, a user will be able to use the search and replace feature hereof to update and synchronize the values of the credentials for the same applications in his/her credential store on the desktop. This maintains seamless and uninterrupted SSO service without users needing to remember or change related credentials in their local credential stores, one at a time. It also provides users with the ability to search for encrypted credentials in their store, find the ones that are using the same credential value defined by the search key and synchronize them all to a new value (by replacing them with the provide credential value for replacement) in a secure manner using the management utility that is controlled by the owner of the store. This is particularly valuable in cases where there are secrets with values matching the search criteria, but are not related to the synchronization suite of applications. In such a case, the owner can exclude secrets from the result list before committing the changed secrets to all of the credentials found. The value proposition here is the ability to search and replace secret components of credentials from different formats with possibly different encryptions in a seamless fashion.

In a computing system environment, the invention may be practiced with: a user interface module for indicating various credentials to be searched-for and replaced (such as by way of a CASA manager; a single-sign-on service; a synchronizing engine interfacing with the single-sign-on service; and at least two credential stores having similar or dissimilar credential information. During use, the synchronizing engine receives credential information in a common format from the stores and is configured to search for the various credentials indicated by a user via the user interface module. Upon finding the various credentials, they become replaced with a new value or credential.

Computer program products are also disclosed. For instance, a product available as a download or on a computer readable medium has components to: request and receive versions of credential information for at least two multiple disparate credential stores; commonly format the versions; and receive user input indicating various user credentials desirable to be searched for and replaced. User or enterprise policies are also used in governance of the credentials, such as by way of authenticating the user.

The CASA architecture is also exploited as part of the invention to leverage existing resources.

These and other embodiments of the present invention will be set forth in the description which follows, and in part will become apparent to those of ordinary skill in the art by reference to the following description of the invention and referenced drawings or by practice of the invention. The claims, however, indicate the particularities of the invention.

BRIEF DESCRIPTION OF THE DRAWINGS

The accompanying drawings incorporated in and forming a part of the specification, illustrate several aspects of the present invention, and together with the description serve to explain the principles of the invention. In the drawings.

DETAILED DESCRIPTION OF THE ILLUSTRATED EMBODIMENTS

In the following detailed description of the illustrated embodiments, reference is made to the accompanying drawings that form a part hereof, and in which is shown by way of illustration, specific embodiments in which the invention may be practiced. These embodiments are described in sufficient detail to enable those skilled in the art to practice the invention and like numerals represent like details in the various figures. Also, it is to be understood that other embodiments may be utilized and that process, mechanical, electrical, arrangement, software and/or other changes may be made without departing from the scope of the present invention. In accordance with the present invention, methods and apparatus for coordinating credentials across disparate credential stores are hereinafter described. Searching and replacement of credentials is another aspect.

Figure 1:
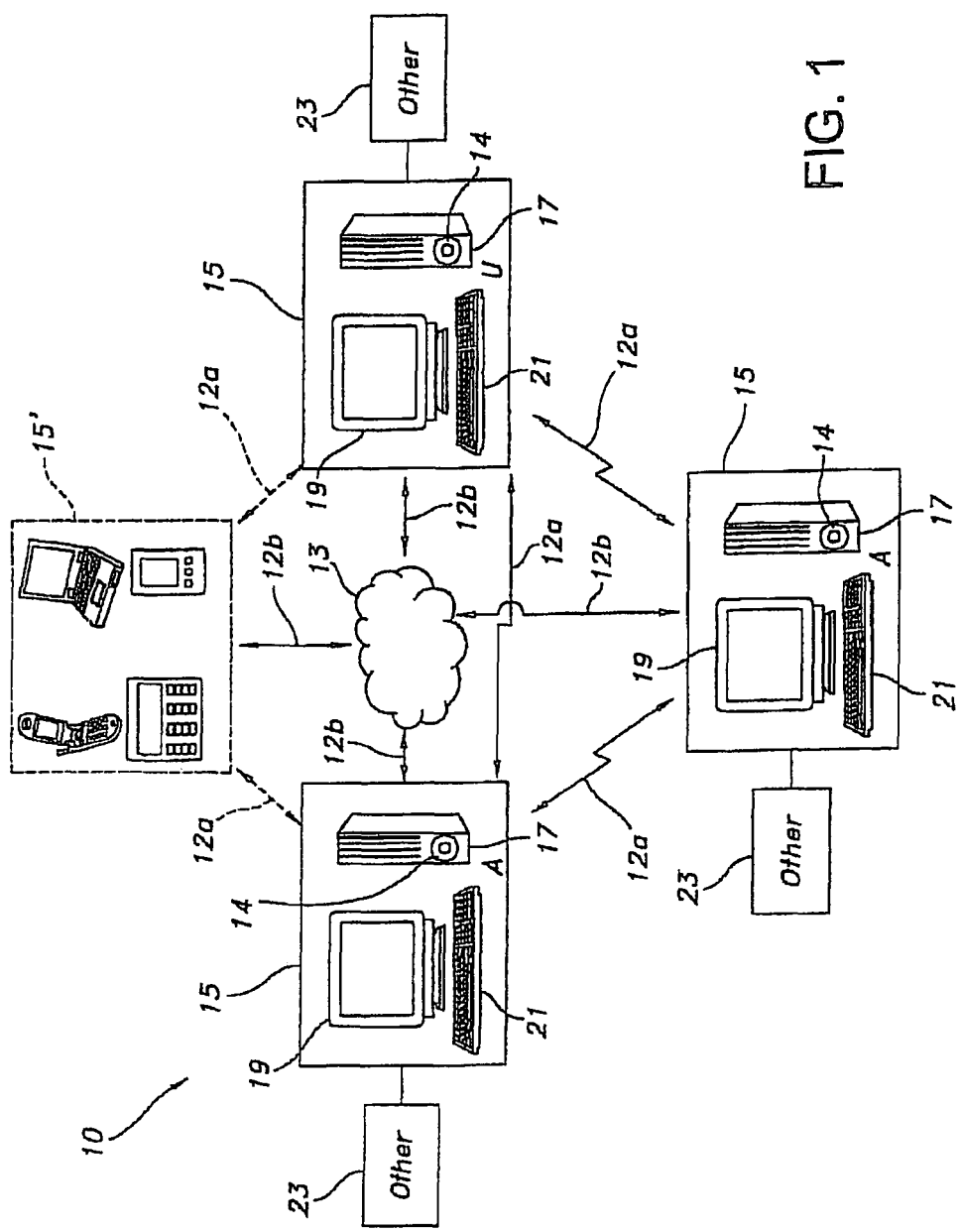
FIG. 1 is a diagrammatic view in accordance with the present invention of a representative computing environment for coordinating credentials across disparate credential stores.

With reference to FIG. 1, a representative computing environment 10 for coordinating credentials occurs by way of one or more computing devices 15 or 15' arranged as individual or networked physical or virtual machines. In a traditional sense, an exemplary computing device typifies a server 17, such as a grid or blade server. Alternatively, it includes a general or special purpose computing device in the form of a conventional fixed or mobile computer 17 having an attendant monitor 19 and user interface 21. The computer internally includes a processing unit for a resident operating system, such as DOS, WINDOWS, MACINTOSH, VISTA, UNIX, and LINUX, to name a few, a memory, and a bus that couples various internal and external units, e.g., other 23, to one another. Representative other items 23 include, but are not limited to, PDA's, cameras, scanners, printers, microphones, joy sticks, game pads, satellite dishes, hand-held devices, consumer electronics, minicomputers, computer clusters, main frame computers, a message queue, a peer machine, a broadcast antenna, a web server, an AJAX client, a grid-computing node, a peer, a virtual machine, a web service endpoint, a cellular phone, or the like. The other items may also be stand alone computing devices 15' in the environment 10 or the computing device itself.

In either, storage devices are contemplated and may be remote or local. While the line is not well defined, local storage generally has a relatively quick access time and is used to store frequently accessed data, while remote storage has a much longer access time and is used to store data that is accessed less frequently. The capacity of remote storage is also typically an order of magnitude larger than the capacity of local storage. Regardless, storage is representatively provided for aspects of the invention contemplative of computer executable instructions, e.g., software, as part of computer program products on readable media, e.g., disk 14 for insertion in a drive of computer 17. Computer executable instructions may also be available as a download or reside in hardware, firmware or combinations in any or all of the depicted devices 15 or 15'.

When described in the context of computer program products, it is denoted that items thereof, such as modules, routines, programs, objects, components, data structures, etc., perform particular tasks or implement particular abstract data types within various structures of the computing system which cause a certain function or group of functions. In form, the computer product can be a download or any available tangible media, such as RAM, ROM, EEPROM, CD-ROM, DVD, or other optical disk storage devices, magnetic disk storage devices, floppy disks, or any other tangible medium which can be used to store the items thereof and which can be assessed in the environment.

In network, the computing devices communicate with one another via wired, wireless or combined connections 12 that are either direct 12a or indirect 12b. If direct, they typify connections within physical or network proximity (e.g., intranet). If indirect, they typify connections such as those found with the internet, satellites, radio transmissions, or the like, and are given nebulously as element 13. In this regard, other contemplated items include servers, routers, peer devices, modems, T1 lines, satellites, microwave relays or the like. The connections may also be local area networks (LAN) and/or wide area networks (WAN) that are presented by way of example and not limitation. The topology is also any of a variety, such as ring, star, bridged, cascaded, meshed, or other known or hereinafter invented arrangement.

Figure 2:
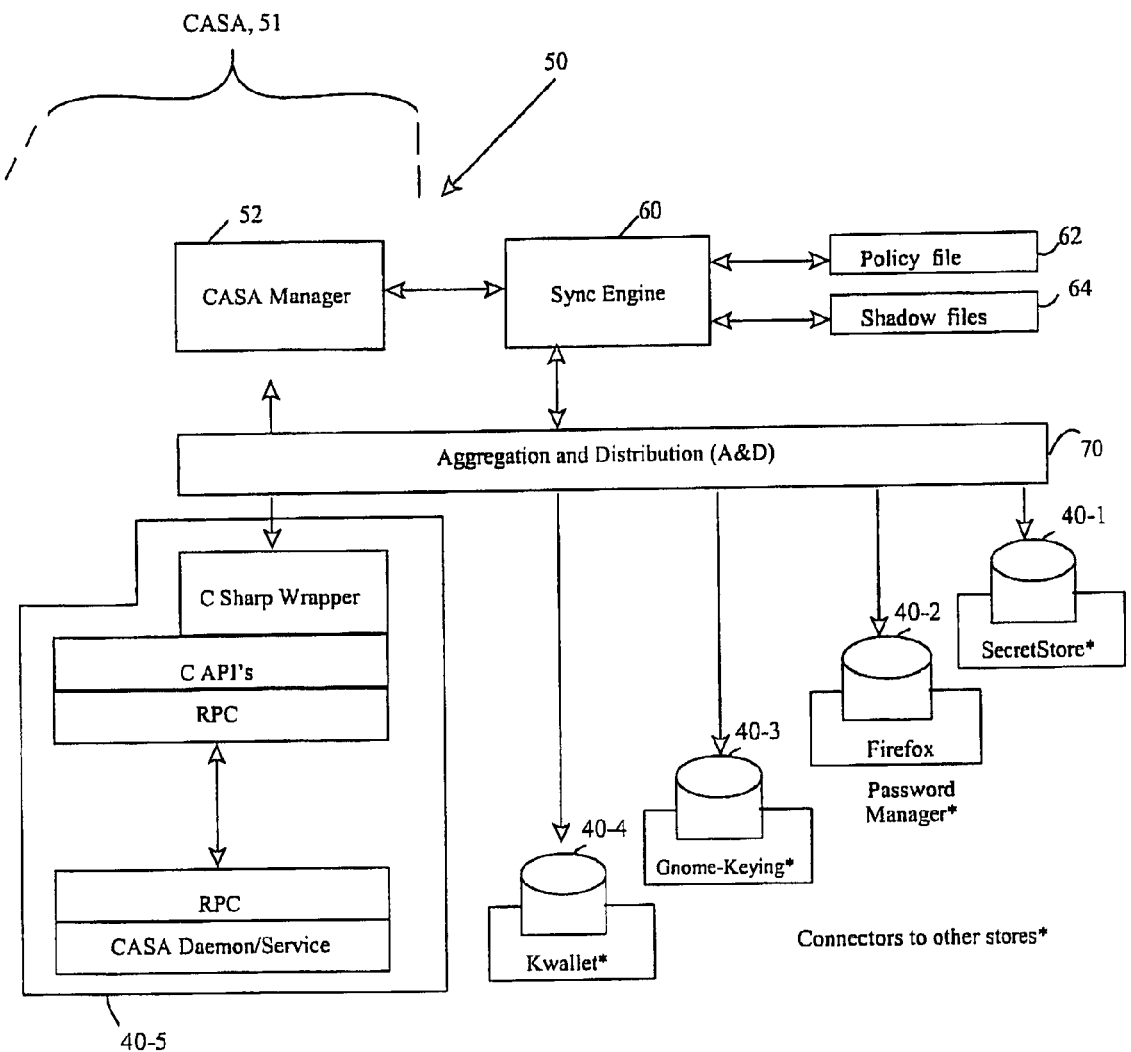
FIG. 2 is a diagrammatic view in accordance with the present invention of a more detailed representative computing environment for coordinating credentials across disparate credential stores.
Figure 3:
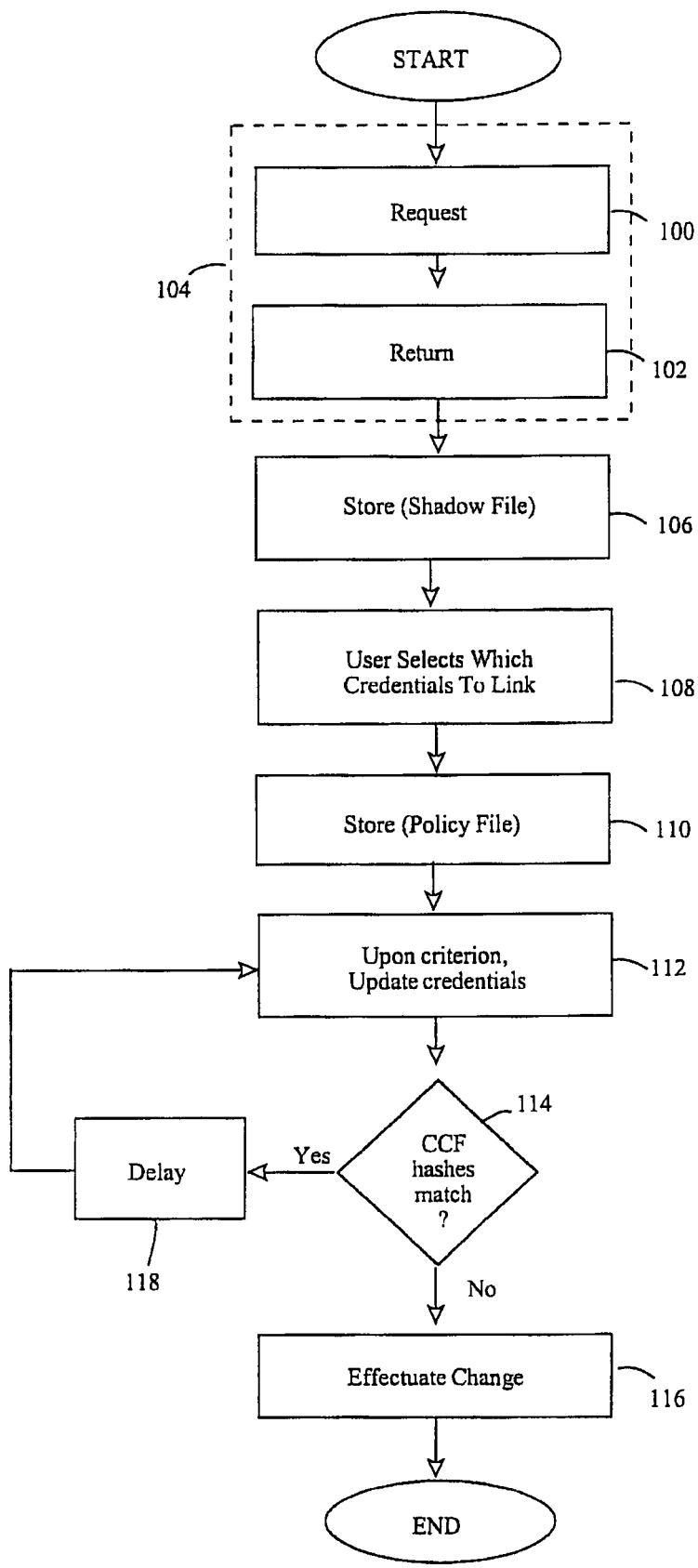
FIG. 3 is a high-level flow chart in accordance with the present invention for coordinating credentials across disparate credential stores.

With the foregoing representative computing environment as backdrop, FIGS. 2 and 3 show a high-level architecture and overall flow of one aspect of the invention. That is, a plurality of disparate credential stores 40-1, 40-2, 40-3, 40-4, 40-5 have dissimilar credential information, such as keys, passwords, or other secrets, based primarily on the propriety nature of the store. Representatively, the stores include, but are not limited to, SecretStore, Firefox Password Manager, Gnome Keyring, KDE Wallet and miCASA, respectively. A single-sign-on service 50 in the computing environment consists of one or more existing applications that are useful to the user for enjoying SSO convenience from one or more computing devices. In that the disparateness of the stores 40 tends to complicate SSO, especially considering that credential information is updated over time, is inconsistent in form or storage from one store to the next, has little if any commonality amongst the stores, etc., the invention further includes a synchronizing engine 60 (with attendant files 62, 64) and a layer 70 intermediate the stores 40 and the synchronizing engine. During use, users indicate which, if any, of the credential information they desire to synch together and, upon common formatting of the credential information by way of the synch engine 60 and layer 70, all linked or synchronized information is updated automatically.

In more detail, Novell Inc.'s CASA brand software (Common Authentication Services Adapter) 51 is a common authentication and security package that provides a set of libraries for application and service developers to enable single sign-on for an enterprise network. Version 1.7, for example, provides a local, session-based credential store (called miCASA) that is populated with desktop and network login credentials, given generically as 40-5. A CASA manager 52 serves as user interface module, such as on monitor 19 (FIG. 1), whereby users can undertake the linking of credentials of the various stores 40.

Currently, CASA manager contains drivers/connectors to the credential stores 40. Upon request, each of these drivers return an enumeration of credentials through a common interface and in a common format, steps 100 and 102. (Together, this is referred to as a Common Credential Format (CCF), step 104.) In a representative embodiment, the format is an XML schema and each driver produces an XML document describing the credential information of the stores 40. So that the CASA manager 52 and the stores 40 have format commonality, the layer 70 is configured there between. Otherwise, the CASA manager interfaces with users as normal and the credential stores keep their own proprietary format.

Upon the return, one embodiment of the invention contemplates storing the credential information as a shadow file 64, step 106. A hash of the credential information occurs at this time and is likewise stored with the shadow file. The user, through the CASA Manager, can then select the various credentials they wish to link together or synchronize, step 108. In one embodiment, this is referred to as a symbolic link and is stored in the policy file 62, step 110, for use by the synchronizing engine.

Figure 4:
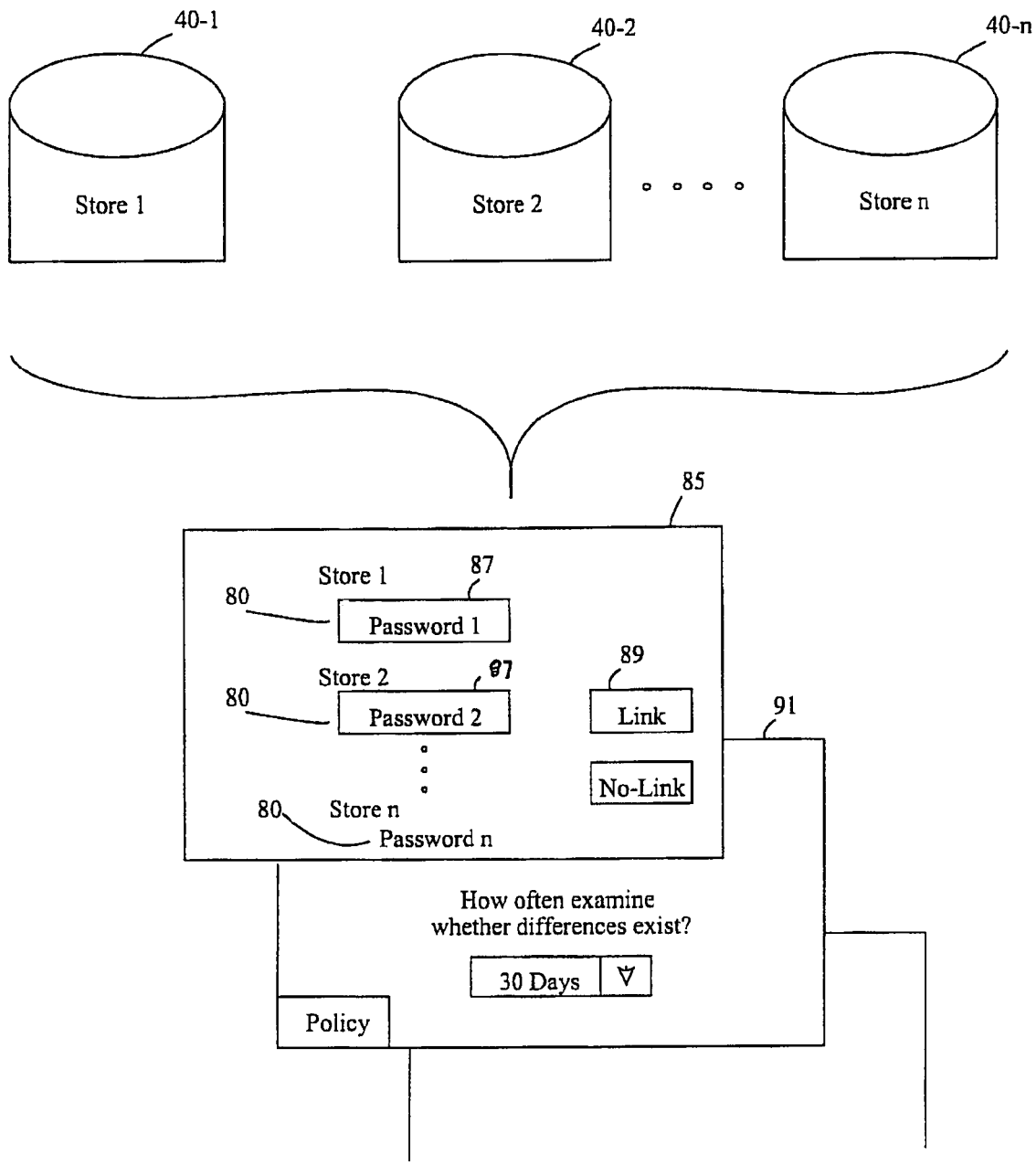
FIG. 4 is a representative diagrammatic view in accordance with the present invention for establishing policy or linking credentials of disparate credential stores.

Diagrammatically, FIG. 4 shows various credential stores 40-1, 40-2, . . . 40-n, returning various credential information 80, such as Password 1, Password 2, . . . Password n, to the user interface module, such as per screen shots or web pages 85 on a monitor of a computing device. In turn, the user selects which of the credentials 80 they desire to synch together. In this case, each of Password 1 and Password 2 are selected, such as by a highlighting box 87, and are linked by clicking on a dedicated linking icon button 89. Of course, those skilled in the art will recognize other techniques for linking credential information of the various stores together.

Returning to FIGS. 2 and 3, upon reaching a criterion, such as a configured interval or based on some trigger policy, the synchronizing engine 60 updates the earlier version of credentials, step 112, by requesting and receiving a new CCF document from each driver. It computes a new hash for the latest or updated version and compares it to the hash earlier-stored in the shadow file(s). If the hashes match, the credential information remains accurate and no further updating is necessary, other than to delay for some pre-defined period, step 118, and repeat the process, e.g., steps 112, and 114. On the other hand, if the hashes do not match, changes are effectuated at step 116. In a representative embodiment, change effectuation consists of the sync engine 60 comparing the CCF documents of the current request with the shadow request. Based on policy, changes are then made either to the shadow file, the target store, or both. The sync engine also queries the symbolic link information file for linked credential keys. If needed, changes to the linked shadow files are propagated to the appropriate store.

For instance, if a user or enterprise policy requires a user to update their single-sign-on password every 30 days, such as per 91, FIG. 4, and the user's password for their Firefox account has not changed, the foregoing allows the inquiry to examine when and if the passwords for the SSO and Firefox are different. If different, the invention recognizes it and effectuates an invisible change to the user such that they can still enjoy a SSO experience, without needing to go back to their Firefox account and change their password, and login credentials to match their SSO password. In other words, the present invention recognizes that users often desire to keep many passwords updated together, without actually having to undertake the work necessary to keep them updated, and accomplishes the change for the individual automatically.

For example, Firefox stores a credential as a username and a password for services requiring authentication. Often, other applications using the same username and password for authentication store that information as a cn (common name) and a pin. The user will recognize that the password saved by Firefox is the same information saved as the pin by another application in a different store. This invention allows the user to link or synchronize the password saved by Firefox with the pin saved by the other application. Hence, when the password changes so does the pin.

In the alternative, however, it should be appreciated that users may want to avoid any linking whatsoever of credential information and so a mechanism, such as default condition of no-linking (absent an affirmative indication of linking) or a no-linking icon button 93, FIG. 4, can be used in certain instances. In this manner, credentials can be kept strictly isolated if desired.

In the case of conflicts, resolution can be accomplished by the policy the user sets up while creating a link between two or more credential keys. In this regard, the policy might be to treat a particular store as Master and another as a Servant, to select a hierarchy of stores having priority over other stores, or to let the user resolve the conflict manually using an Administration or other tool. The policy may also be a time frame, a security measure, combinations thereof, or any hereinafter contemplated feature useful in defining conditions on the linking.

Figure 5A:
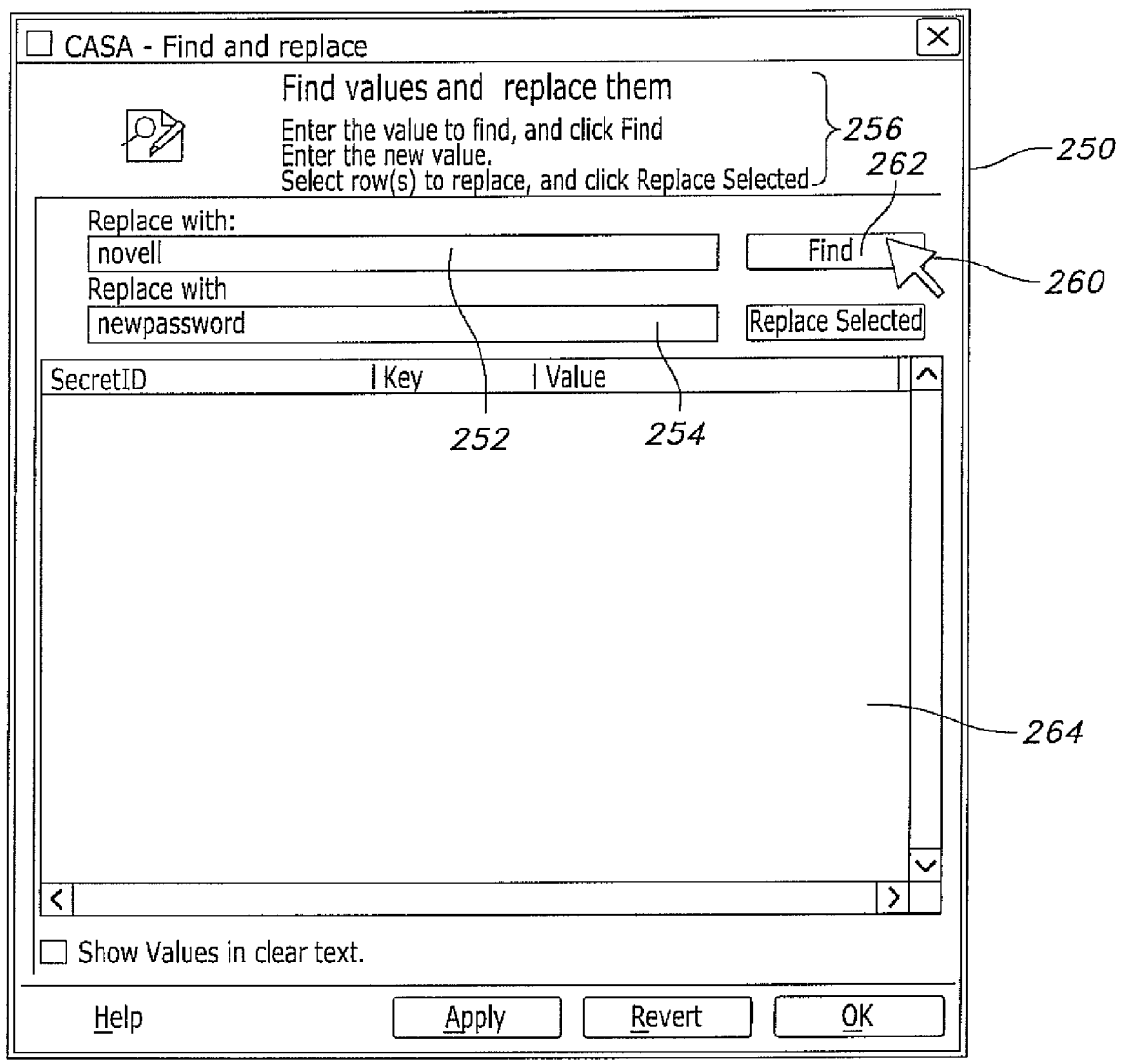
FIGS. 5A and 5B are representative diagrammatic views in accordance with the present invention for searching and replacing credential information.
Figure 5B:
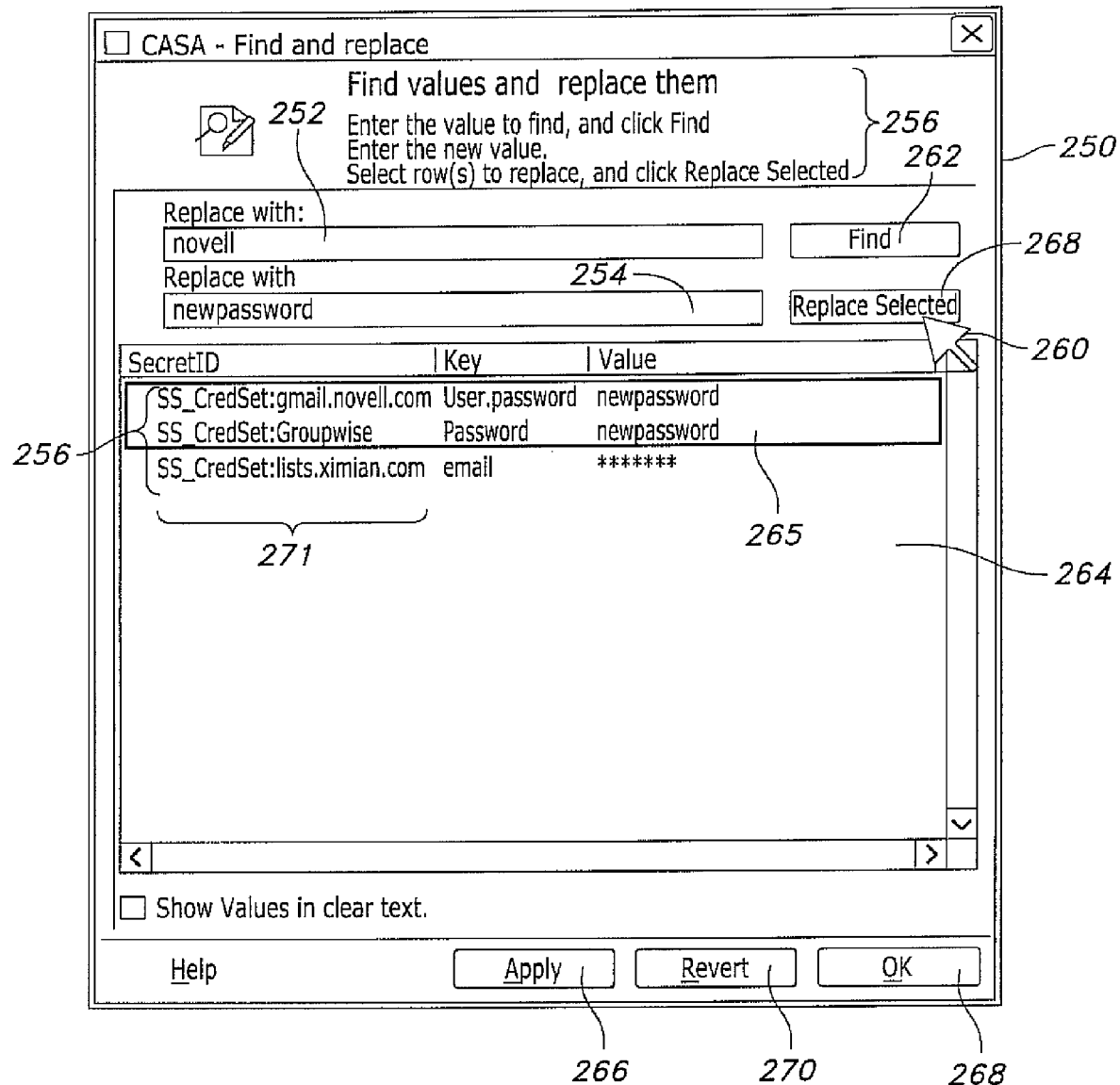
Figure 6:
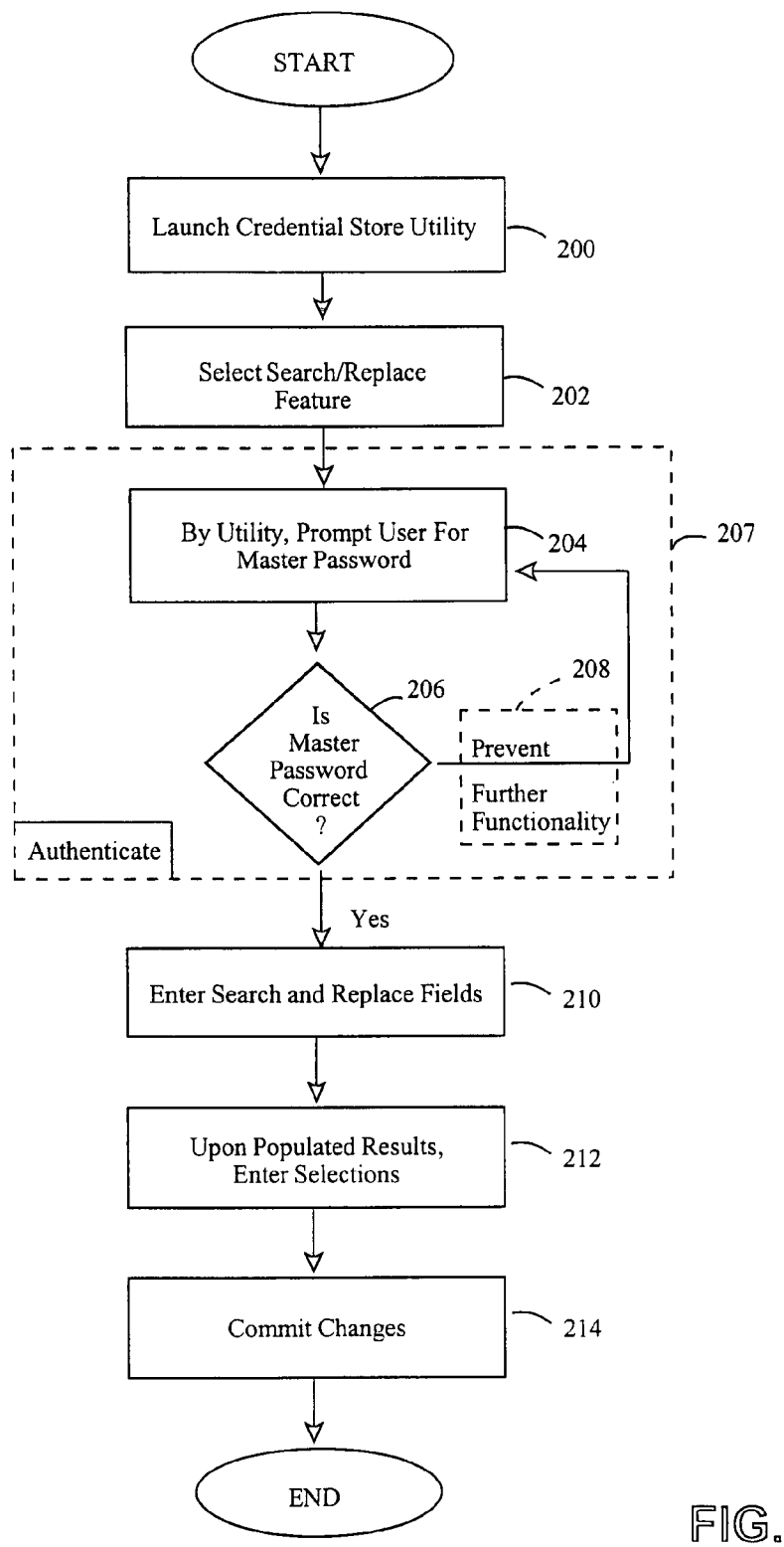
FIG. 6 is a flow chart in accordance with the present invention for searching and replacing credential information.

Appreciating users will likely have many different credentials amongst the various credential stores, convenient locating and replacing of these is another aspect of the invention. With reference to FIGS. 5A, 5B, and 6, a first embodiment contemplates launching a credential store utility at step 200. In so doing, the foregoing described functionality of linking credential information is made available, including the common formatting of disparate credential information from disparate credential stores. At step 202, by way of a search and replace feature of the utility, users can then locate their credential information, from whatever store, and change it in quantity or singularly, or by way of any other criteria.

At steps 204 and 206, it is contemplated that authentication (dashed box, 207) of the user's authority occur in order to proceed with further manipulation of credential information. Thus, the utility prompts the user for an entry of a master password (such as that corresponding to login in the SSO environment), step 204, and upon appropriate entry and verification of same, step, 206, users have been authenticated. The credential stores then become available for general use and users may proceed with changing credential information. On the other hand, if the master password is improper, users are again re-prompted for the master password at step 204 with the ability to proceed with changing credentials upon passing at step 206. Optionally, it may be desirable to prevent further processing with the search and replace feature of the utility if the user cannot eventually authenticate him- or herself. Thus, optional step 208 provides the prevention of further functionality after a predetermined number of failures (such as 1, 2, 3, etc.) has occurred at step 206.

To the extent the user's authority has been authenticated at step 206, this now means the presentation of a user-interface dialog, e.g. box 250 on a monitor 19 (FIG. 1), that accepts entry of search and replace fields 252, 254 at step 210. As described in the user-interface instructions 256, users simply enter a "value" to "find," or be searched-for, (in this instance the word Novell). They then "click Find," such as by using a pointing device 260 on the icon 262 labeled "Find." The utility then searches the credential stores for values matching that of the search field 252.

At step 212, the results 263 of the Find are populated and displayed in a portion 264 of the user-interface dialog, whereby users make selections (indicated by shading 265) of the credential information they desire to change. Upon entry of an appropriate "Replace with" value 254, (in this instance the word "newpassword"), users "click Replace Selected" 256, such as by using the pointing device 260 on the icon 268 labeled "Replace Selected." At step 212, the changes are committed. In this manner, users can singularly or collectively change mismatched credential information. It is also the case that users need not know how many passwords or other identifying secrets are available to them, per the various credential stores, because the invention identifies all credential information having common values and gives the users an opportunity to link them together, or not.

In alternative embodiments, changes in credential information can be committed, by way of clicking on any of the icons labeled "Apply" 266 or "OK" 268, or upon selection of the "enter" key found on most computing keyboards.

In a reverse embodiment, it may be desirable that users want to undo earlier linking of credential information. In this regard, a "Revert" icon 270 is provided whereby users have functionality to restore credential information of any particular credential store, e.g., 271, back to an earlier or original setting. Other options for this also include a "Restore Default" functional icon (not shown) or the like.

In any embodiment, certain advantages and benefits over the prior art should be readily apparent. For example, but not limited to, the invention provides advantage over the art according to: 1) the ability to link and synchronize credentials across multiple stores according to application(s) of policy; 2) providing an "umbrella service" giving users a single point of use, management, and administration for multiple credential stores. (Compared to the prior art, others focus on proprietary solutions, not interoperability between stores); 3) overcoming complexity in the working environment of standard operating systems. (An illustration of this relates to current Linux distributions that, by default, provide the two popular choices of desktops (Gnome, and KDE) and each come with its own credential store and the applications that use one or the other, but not both. Now users can utilize the instant invention and use all effectively.) Appreciating complexity in computing environments, other expansions to the invention include, but are not limited to: adding peer-to-peer linking and synchronization capability for users to synchronize their multiple desktops (e.g., peer-to-peer Windows brand workstations linked to peer-to-peer Linux desktops, or vice versa); or having linking capability between clients and servers (e.g., linking desktop credential store(s) to eDirectory SecretStore); and 4) the ability to apply uniform policy across disparate stores through a single point of management.

In still other embodiments, the invention gives users the ability to affirmatively search for and find credential information amongst disparate stores for the purpose of conveniently changing one or more together from a single point of control. The searching and replacing feature also provides a mechanism whereby users can fully understand how many passwords, secrets, keys, etc., they have over the many disparate stores available to them and affirmatively control their relationship to other credential information. Un-linking of credential information is still another advantage over the art. In any event, the invention allows maintaining seamless and uninterrupted SSO service.

Finally, one of ordinary skill in the art will recognize that additional embodiments are also possible without departing from the teachings of the present invention. This detailed description, and particularly the specific details of the exemplary embodiments disclosed herein, is given primarily for clarity of understanding, and no unnecessary limitations are to be implied, for modifications will become obvious to those skilled in the art upon reading this disclosure and may be made without departing from the spirit or scope of the invention. Relatively apparent modifications, of course, include combining the various features of one or more figures with the features of one or more of other figures.

The invention claimed is:

1. In a computing system environment, a method of searching and replacing user credentials in an environment of multiple disparate credential stores associated with a SSO (Single-Sign-On) service, comprising:
    via a common user interface of the computing system, authenticating an authority of a user to change credential information, where the common user interface is a single point of control for searching and replacing the user credentials;
    if authenticated, searching via the common user interface for the credential information of at least two of said multiple disparate credential stores associated with the SSO service;
    in response to the searching, receiving the requested credential information through the common interface and in a common format; and
    displaying the received credential information in the common user interface;
    receiving new credential information from the user through the common user interface;
    receiving user input through the common user interface to replace each of the received credential information with the new credential information; and
    at a same time and responsive to the user input, replacing each of the received credential information from the at least two multiple disparate credential stores with the new credential information via the common interface.

2. The method of claim 1, wherein the replacing further includes making the credential information for the at least two of said multiple disparate credential stores a same value.

3. The method of claim 1, further including reverting the new credential information back to an original value.

4. The method of claim 1, wherein the authenticating further includes launching a credential store utility providing the common interface for the common format.

5. The method of claim 4, further including retrofitting an existing single-sign-on service with the credential store utility.

6. The method of claim 1, further including establishing a policy for when the replacing can occur.

7. The method of claim 1, further including replacing all the credential information of each said multiple disparate credential stores in a single replacement step.

8. The method of claim 1, further including indicating no-synchronizing of the credential information.

9. In a computing system environment, a method of searching and replacing user credentials in an environment of multiple disparate credential stores associated with a SSO (Single-Sign-On) service, comprising:
    searching via a common user interface of the computing system for credential information for at least two of said multiple disparate credential stores associated with the SSO service upon authenticating a user to change the user credentials, where the common user interface is a single point of control for searching and replacing the user credentials;
    in response to the searching, receiving the requested credential information via the common interface; and
    displaying the received credential information in the common user interface;
    receiving new credential information from the user through the common user interface;
    receiving user input through the common user interface to replace each of the received credential information with the new credential information; and
    at a same time and in response to the user input, replacing each of the received credential information from the at least two multiple disparate credential stores with the new credential information.

10. The method of claim 9, wherein the receiving the requested credential information further includes receiving through the common interface and in a common format.

11. The method of claim 9, further including authenticating an authority of a user for the replacing.

12. The method of claim 9, wherein the replacing the credential information from the at least two multiple disparate credential stores with the new credential information occurs upon a single activation in a user-interface dialog.

13. The method of claim 9, further including providing a synchronizing engine to interface with a single-sign-on service, the synchronizing engine for the receiving and the replacing.

14. The method of claim 13, further including interfacing the synchronizing engine and the single-sign-on service with a layer intermediate the multiple disparate credential stores.

15. A computing system for searching and replacing user credentials in an environment of multiple disparate credential stores associated with a SSO (Single-Sign-On) service, comprising:
    a user interface module of the computing system for indicating various credentials to be searched-for and replaced, where the user interface module is configured to generate a common user interface that is a single point of control for searching and replacing the user credentials;
    a single-sign-on service;
    a synchronizing engine interfacing with the single-sign-on service; and
    at least two credential stores having dissimilar credential information associated with the SSO service, wherein the synchronizing engine is configured to search for the various credentials said indicated by a user via the common user interface upon authenticating the user to change the user credentials and finding said various credentials to: display the various credentials in the common user interface; receive new credential information via the common user interface, receive user input to replace each of the various credentials with the new credential information; and at a same time and in response to the user input, replace the various credentials with the new credential information.

16. The computing system of claim 15, wherein the user interface module includes a CASA manager.

17. A non-transitory, computer-readable storage medium having stored thereon instructions, which, when executed by one or more hardware processors, causes the one or more processors to perform operations comprising:
    via a common user interface of a computer system, authenticating an authority of a user to change credential information, where the common user interface is a single point of control for searching and replacing the user credentials;
    if authenticated, searching via the common user interface for the credential information of at least two multiple disparate credential stores associated with a SSO (Single-Sign-On) service;

in response to the searching, receiving the requested credential information through the common interface and in a common format;

displaying the received credential information in the common user interface;

receiving new credential information from the user through the common user interface;

receiving user input through the common user interface to replace each of the received credential information with the new credential information; and at a same time and responsive to the user input, replacing each of the received credential information from the at least two multiple disparate credential stores with the new credential information via the common user interface.

18. The non-transitory, computer-readable storage medium of claim 17, wherein the replacing further includes making the credential information for the at least two of said multiple disparate credential stores a same value.

19. The non-transitory, computer-readable storage medium of claim 17, further including reverting the new credential information back to an original value.

20. The non-transitory, computer-readable storage medium of claim 17, wherein the authenticating further includes launching a credential store utility providing the common user interface for a common format.

21. The non-transitory, computer-readable storage medium of claim 20, further including retrofitting an existing single-sign-on service with the credential store utility.

22. The non-transitory, computer-readable storage medium of claim 17, further including establishing a policy for when the replacing can occur.

23. The non-transitory, computer-readable storage medium of claim 17, further including replacing all the credential information of each said multiple disparate credential stores in a single replacement step.

24. The non-transitory, computer-readable storage medium of claim 17, further including indicating no-synchronizing of the credential information.

25. A non-transitory, computer-readable storage medium having stored thereon instructions, which, when executed by one or more hardware processors, causes the one or more processors to perform operations comprising:

searching via a common user interface of a computer system for credential information for at least two of said multiple disparate credential stores associated with a SSO (Single-Sign-On) service upon authenticating a user to change the credential information, were the common user interface is a single point of control for searching and replacing the user credentials;

in response to the searching, receiving the requested credential information via the common interface; and displaying the received credential information in the common user interface;

receiving new credential information from the user through the common user interface;

receiving user input through the common user interface to replace each of the received credential information with the new credential information; and at a same time and in response to the user input, replacing each of the received credential information from the at least two multiple disparate credential stores with the new credential information.

26. The non-transitory, computer-readable storage medium of claim 25, wherein the receiving the requested credential information further includes receiving through the common user interface and in a common format.

27. The non-transitory, computer-readable storage medium of claim 25, further including authenticating an authority of a user for the replacing.

28. The non-transitory, computer-readable storage medium of claim 25, wherein the replacing the credential information from the at least two multiple disparate credential stores with the new credential information occurs upon a single activation in a user-interface dialog.

29. The non-transitory, computer-readable storage medium of claim 25, further including providing a synchronizing engine to interface with a single-sign-on service, the synchronizing engine for the receiving and the replacing.

30. The non-transitory, computer-readable storage medium of claim 29, further including interfacing the synchronizing engine and the single-sign-on service with a layer intermediate the multiple disparate credential stores.

* * * * *

UNITED STATES PATENT AND TRADEMARK OFFICE
CERTIFICATE OF CORRECTION

| | | |
|---|---|---|
| PATENT NO. | : 8,863,246 B2 | Page 1 of 1 |
| APPLICATION NO. | : 11/897737 | |
| DATED | : October 14, 2014 | |
| INVENTOR(S) | : James M. Norman et al. | |

It is certified that error appears in the above-identified patent and that said Letters Patent is hereby corrected as shown below:

In the Claims

Column 12, Line 5 at Claim 25; replace:
"user to change the credential information, were the com-" with
-- user to change the credential information, where the com- --

Signed and Sealed this
Twenty-ninth Day of September, 2015

Michelle K. Lee
*Director of the United States Patent and Trademark Office*